US008633142B2

(12) United States Patent
Carty et al.

(10) Patent No.: US 8,633,142 B2
(45) Date of Patent: *Jan. 21, 2014

(54) POLY (HYDROXYCARBOXYLIC ACID) AMIDE SALT DERIVATIVE AND LUBRICATING COMPOSITION CONTAINING IT

(75) Inventors: Jan Elsa Eugenia Carty, Sugar Land, TX (US); Dennis Borisovich Kruchinin, Ince Chester (GB); Mark Clift Southby, Ince Chester (GB); Susan Jane Smith, Chester (GB); Nigel Peter Tait, Chester (GB)

(73) Assignee: Shell Oil Company, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/056,134

(22) PCT Filed: Jul. 29, 2009

(86) PCT No.: PCT/US2009/052063
§ 371 (c)(1),
(2), (4) Date: Apr. 13, 2011

(87) PCT Pub. No.: WO2010/014678
PCT Pub. Date: Feb. 4, 2010

(65) Prior Publication Data
US 2011/0207640 A1 Aug. 25, 2011

(30) Foreign Application Priority Data

Jul. 31, 2008 (EP) .................................. 08161566

(51) Int. Cl.
*C10M 149/00* (2006.01)
*C10M 133/16* (2006.01)
(52) U.S. Cl.
USPC ............. 508/464; 508/508; 508/591; 44/387
(58) Field of Classification Search
USPC .................... 508/508, 464; 44/387
See application file for complete search history.

(56) References Cited

U.S. PATENT DOCUMENTS

| 3,275,554 | A | 9/1966 | Wagenaar ....................... 252/50 |
| 3,306,908 | A | 2/1967 | Le Suer ....................... 260/326.3 |
| 3,438,757 | A | 4/1969 | Honmen et al. .................. 44/58 |
| 3,454,555 | A | 7/1969 | Van der Voort et al. ....... 260/239 |
| 3,565,804 | A | 2/1971 | Honnen et al. ................... 252/50 |
| 3,755,433 | A | 8/1973 | Miller et al. .................. 252/51.5 |
| 3,822,209 | A | 7/1974 | Knapp et al. ..................... 252/47 |
| 3,996,059 | A | 12/1976 | Stansfield et al. |
| 4,349,389 | A | 9/1982 | Schofield ....................... 106/308 |
| 4,512,776 | A | 4/1985 | Lundberg |
| 4,512,903 | A | 4/1985 | Schlicht et al. .......... 252/51.5 A |
| 4,525,288 | A | 6/1985 | Schlicht .................... 252/32.7 E |
| 4,746,739 | A | 5/1988 | Yeats et al. .................... 544/222 |
| 4,814,010 | A | 3/1989 | Tury .......................... 106/14.31 |
| 5,000,792 | A | 3/1991 | Ohta et al. ...................... 106/499 |
| 5,139,692 | A | 8/1992 | Powell et al. ..................... 252/77 |
| 5,149,454 | A | 9/1992 | Bloink et al. ..................... 252/74 |
| 5,279,753 | A | 1/1994 | Bloink et al. ..................... 252/74 |
| 5,536,445 | A | 7/1996 | Campbell et al. ............. 252/308 |
| 5,858,029 | A | 1/1999 | Oumar-Mahamat et al. ... 44/418 |
| 5,952,274 | A | 9/1999 | Rieckert et al. ............... 508/554 |
| 6,458,173 | B1 | 10/2002 | Lin ................................. 44/389 |
| 2002/0065201 | A1 | 5/2002 | Ribeaud et al. ............... 508/375 |
| 2003/0096716 | A1 | 5/2003 | Locke et al. .................. 508/525 |

FOREIGN PATENT DOCUMENTS

| EP | 164817 | 12/1985 | ............. B01F 17/00 |
| EP | 0194718 | 4/1990 | .......... C10M 161/00 |
| EP | 668342 | 8/1995 | ............. C10G 65/04 |
| EP | 776959 | 6/1997 | ............. C10G 65/04 |
| EP | 1314767 | 5/2003 | ............. C09D 11/00 |
| EP | 1728848 | 12/2006 | .......... C10M 161/00 |
| EP | 1757673 | 2/2007 | .......... C10M 163/00 |
| GB | 1342746 | 1/1974 | ............. C08G 39/00 |
| GB | 1373660 | 11/1974 | ............. C08G 17/02 |
| GB | 2001083 | 1/1979 | ............. C08G 73/04 |
| GB | 2201678 | 9/1988 | |
| JP | 53050291 | 5/1978 | ............... C08F 8/46 |
| JP | 53056610 | 5/1978 | ............... C07C 69/40 |
| JP | 56120679 | 2/1981 | ........... C07D 307/60 |
| JP | 58171488 | 10/1983 | ............... C10M 1/32 |
| WO | WO9517473 | 6/1995 | ............. C09B 67/04 |

(Continued)

OTHER PUBLICATIONS

Selby, T.W.: Continued Studies of the Causes of Engine Oil Phosphorus Volatility—Part 2, SAE Technical Paper Series, 2007 World Ullmann's Encyclopedia of Industrial Chemistry, 5$^{th}$, completely revised edition, vol. A16: Magnetic Materials to Mutagenic Agents, Motor Fuels, p. 719-753.
API Publication 1509, 16$^{th}$ Edition, Appendix E, API Base Oil Interchangeability Guidelines for Passenger Car Motor Oils and Diesel Engine Oils, Mar. 2007 version, pp. E1-E23.
Kirk-Othmer, Encyclopedia of Chemical Technology, 4$^{th}$ Edition, vol. 12, pp. 341-388, Gasoline and Other Motor Fuels, 1994.
Kirk-Othmer, Encyclopedia of Chemical Technology, 3$^{rd}$ Edition, vol. 14, pp. 477-526, Lubrication and Lubricants.
De Jong F.et al., "Feasibility Studies for Crankcase Additives", AMGR. 87-276, (Jan. 1983-Dec. 1985), pp. 7, 8, 1 and ii.
PCT International Search Report dated May 10, 2007 for PCT/EP2007/054232. Congress Detroit, Michigan, Apr. 16-19, 2007, SAE 2007-01-1073.

*Primary Examiner* — Taiwo Oladapo

(57) ABSTRACT

The present invention provides a poly(hydroxycarboxylic acid) amide salt derivative having formula (III): [Y—CO[O-A-CO]$_n$—Z—R$^+$]$_m$pX$^{q-}$ (III) wherein Y is hydrogen or an optionally substituted hydrocarbyl group, A is a divalent optionally substituted hydrocarbyl group, n is from 1 to 100, preferably from 1 to 10, m is from 1 to 4, q is from 1 to 4 and p is an integer such that pq=m, Z is an optionally substituted divalent bridging group which is attached to the carbonyl group through a nitrogen atom, R+ is an ammonium group and Xq– is a non-sulphur-containing anion. Furthermore, the present invention provides a lubricating composition and a fuel composition containing the poly(hydroxycarboxylic acid) amide salt derivative and the use of the poly(hydroxycarboxylic acid) amide salt derivative for decreasing the phosphorus volatility of a fluid.

12 Claims, No Drawings

(56) References Cited

FOREIGN PATENT DOCUMENTS

| | | | |
|---|---|---|---|
| WO | WO 9517473 A1 * | 6/1995 | |
| WO | WO9607689 | 3/1996 | ............ C08G 63/664 |
| WO | WO9721788 | 6/1997 | ............ C10G 67/04 |
| WO | WO9741092 | 11/1997 | ............ C07C 235/08 |
| WO | WO9920720 | 4/1999 | ............ C01M 143/08 |
| WO | WO9941332 | 8/1999 | ............ C10G 69/02 |
| WO | WO0008115 | 2/2000 | ............ C10G 45/58 |
| WO | WO0014179 | 3/2000 | ............... C10G 2/00 |
| WO | WO0014183 | 3/2000 | ............ C10G 45/58 |
| WO | WO0014187 | 3/2000 | |
| WO | WO0014188 | 3/2000 | ............ C10M 105/04 |
| WO | WO0015736 | 3/2000 | ............. C10G 65/00 |
| WO | WO0034418 | 6/2000 | ................ C10L 1/18 |
| WO | WO0118156 | 3/2001 | ............ C10M 101/02 |
| WO | WO0157166 | 8/2001 | ............ C10M 171/02 |
| WO | WO03104620 | 12/2003 | |
| WO | WO2005073551 | 8/2005 | .............. F03D 11/00 |
| WO | WO2006047745 | 5/2006 | .............. C09K 8/524 |
| WO | WO2006054045 | 5/2006 | ............ C10M 133/54 |
| WO | WO2007128740 | 11/2007 | |
| WO | WO2009050287 | 4/2009 | .............. C10L 1/224 |

\* cited by examiner

POLY (HYDROXYCARBOXYLIC ACID) AMIDE SALT DERIVATIVE AND LUBRICATING COMPOSITION CONTAINING IT

PRIORITY CLAIM

The present application claims priority from PCT/US2009/052063, filed 29 Jul. 2009, which claims priority from European Application EP 08161566.8, filed 31 Jul. 2008.

TECHNICAL FIELD OF THE INVENTION

The present invention relates to a poly(hydroxycarboxylic acid) amide salt derivative, and to a lubricating composition and fuel composition containing it. More specifically, the present invention relates to a lubricating composition and fuel composition for use in internal combustion engines.

SUMMARY OF THE INVENTION

In some embodiments, the present invention comprises a poly(hydroxycarboxylic acid) amide salt derivative having formula (III):

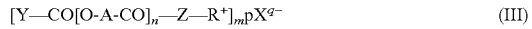

where Y is hydrogen or an optionally substituted hydrocarbyl group, A is a divalent optionally substituted hydrocarbyl group, n is from 1 to 100, preferably from 1 to 10, m is from 1 to 4, q is from 1 to 4 and p is an integer such that pq=m, Z is an optionally substituted divalent bridging group which is attached to the carbonyl group through a nitrogen atom, $R^+$ is an ammonium group and $X^{q-}$ is a non-sulphur-containing anion. The anion $X^{q-}$ may be selected from the group consisting of OH, phenate groups, salicylate groups, oleate groups, acetate groups and combinations thereof and the poly (hydroxycarboxylic acid) amide salt derivative may have a total base number value of less than 30 mg.KOH/g, preferably less than 20 mg.KOH/g.

It is an object of the present invention to decrease the phosphorus volatility (in particular as described in T. W. Selby, R. J. Bosch and D. C. Fee, "Continued Studies of the Causes of Engine Oil, Phosphorus Volatility—Part 2" SAE 2007-01-1073) of a fluid, preferably of a lubricating composition.

It is another object of the present invention to provide alternative lubricating compositions, especially for use in internal combustion engines.

DETAILED DESCRIPTION OF THE PREFERRED EMBODIMENTS

One or more of the above or other objects can be obtained by the present invention by providing a poly(hydroxycarboxylic acid) amide salt derivative having formula (III):

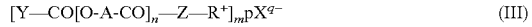

wherein Y is hydrogen or an optionally substituted hydrocarbyl group, A is a divalent optionally substituted hydrocarbyl group, n is from 1 to 100, preferably from 1 to 10, m is from 1 to 4, q is from 1 to 4 and p is an integer such that pq=m, Z is an optionally substituted divalent bridging group which is attached to the carbonyl group through a nitrogen atom, $R^+$ is an ammonium group and $X^{q-}$ is a non-sulphur-containing anion.

It has surprisingly been found according to the present invention that the use of the poly(hydroxycarboxylic acid) amide salt derivative according to the present invention results in improved phosphorus volatility properties.

In this respect it is noted that WO 2007/128740 discloses poly(hydroxycarboxylic acid) amide salt derivatives with the same formula (III). However, WO 2007/128740 does not literally disclose poly(hydroxycarboxylic acid) amide salt derivatives wherein the anion $X^{q-}$ is non-sulphur-containing. Furthermore, WO 2007/128740 does not relate to the improvement of phosphorus volatility properties.

In formula (III) according to the present invention, $R^+$ may be a primary, secondary, tertiary or quaternary ammonium group. $R^+$ is preferably a quaternary ammonium group.

In formula (III), A is preferably a divalent straight chain or branched hydrocarbyl group as hereafter described for formulae (I) and (II).

That is to say, in formula (III), A is preferably an optionally substituted aromatic, aliphatic or cycloaliphatic straight chain or branched divalent hydrocarbyl group. More preferably, A is an arylene, alkylene or alkenylene group, in particular an arylene, alkylene or alkenylene group containing in the range of from 4 to 25 carbon atoms, more preferably in the range of from 12 to 20 carbon atoms.

Preferably, in said compound of formula (III), there are at least 4 carbon atoms, more preferably in the range of from 8 to 14 carbon atoms connected directly between the carbonyl group and the oxygen atom derived from the hydroxyl group.

In the compound of formula (III), the optional substituents in the group A are preferably selected from hydroxy, halo or alkoxy groups, especially $C_{1-4}$ alkoxy groups.

In formula (III), Y is preferably an optionally substituted hydrocarbyl group as hereinafter described for formula (I).

That is to say, the optionally substituted hydrocarbyl group Y in formula (III) is preferably aryl, alkyl or alkenyl containing up to 50 carbon atoms, more preferably in the range of from 7 to 25 carbon atoms. For example, the optionally substituted hydrocarbyl group Y may be conveniently selected from heptyl, octyl, undecyl, lauryl, heptadecyl, heptadenyl, heptadecadienyl, stearyl, oleyl and linoleyl.

Other examples of said optionally substituted hydrocarbyl group Y in formula (III) herein include $C_{4-8}$ cycloalkyls such as cyclohexyl; polycycloalkyls such as polycyclic terpenyl groups which are derived from naturally occurring acids such as abietic acid; aryls such as phenyl; aralkyls such as benzyl; and polyaryls such as naphthyl, biphenyl, stibenyl and phenylmethylphenyl.

In the present invention, the optionally substituted hydrocarbyl group Y in formula (III) may contain one or more functional groups such as carbonyl, carboxyl, nitro, hydroxy, halo, alkoxy, amino, preferably tertiary amino (no N—H linkages), oxy, cyano, sulphonyl and sulphoxyl. The majority of the atoms, other than hydrogen, in substituted hydrocarbyl groups are generally carbon, with the heteroatoms (e.g., oxygen, nitrogen and sulphur) generally representing only a minority, about 33% or less, of the total non-hydrogen atoms present.

Those skilled in the art will appreciate that functional groups such as hydroxy, halo, alkoxy, nitro and cyano in a substituted hydrocarbyl group Y will displace one of the hydrogen atoms of the hydrocarbyl, whilst functional groups such as carbonyl, carboxyl, tertiary amino (—N—), oxy, sulphonyl and sulphoxyl in a substituted hydrocarbyl group will displace a —CH— or —CH$_2$— moiety of the hydrocarbyl.

More preferably, the hydrocarbyl group Y in formula (III) is unsubstituted or substituted by a group selected from hydroxy, halo or alkoxy group, even more preferably $C_{1-4}$ alkoxy.

Most preferably, the optionally substituted hydrocarbyl group Y in formula (III) is a stearyl group, 12-hydroxystearyl group, an oleyl group or a 12-hydroxyoleyl group, and that derived from naturally occurring oil such as tall oil fatty acid.

In formula (III), Z is preferably an optionally substituted divalent bridging group represented by formula (IV)

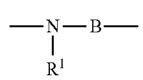
(IV)

wherein $R^1$ is hydrogen or a hydrocarbyl group and B is an optionally substituted alkylene group.

Examples of hydrocarbyl groups that may represent $R^1$ include methyl, ethyl, n-propyl, n-butyl and octadecyl.

Examples of optionally substituted alkylene groups that may represent B include ethylene, trimethylene, tetramethylene and hexamethylene.

Examples of preferred Z moieties in formula (III) include —NHCH$_2$CH$_2$—, —NHCH$_2$C(CH$_3$)$_2$CH$_2$— and —NH(CH$_2$)$_3$—.

Preferably, $R^+$ may be represented by formula (V)

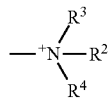
(V)

wherein $R^2$, $R^3$ and $R^4$ may be selected from hydrogen and alkyl groups such as methyl.

The anion $X^{q-}$ of the compound of formula (III) can be any non-sulphur-containing anion (or mixture of anions) suitable to balance the positive charge of the poly(hydroxycarboxylic acid) amide cation.

The anion $X^{q-}$ may be a non-sulphur-containing anion such as a non-sulphur-containing organic anion or a non-sulphur-containing inorganic anion.

Non-limiting examples of suitable anions are OH$^-$, CH$^-$, NH$_3^-$, HCO$_3^-$, HCOO$^-$, CH$_3$COO$^-$, H$^-$, BO$_3^{3-}$, CO$_3^{2-}$, C$_2$H$_3$O$_2^-$, HCO$^{2-}$, C$_2$O$_4^{2-}$, HC$_2$O$_4^-$, NO$_3^-$, NO$_2^-$, N$^{3-}$, NH$_2^-$, O$^{2-}$, O$_2^{2-}$, BeF$_3^-$, F$^-$, Na$^-$, [Al(H$_2$O)$_2$(OH)$_4$]$^-$, SiO$_3^{2-}$, SiF$_6^{2-}$, H$_2$PO$_4^-$, P$^{3-}$, PO$_4^{3-}$, HPO$_4^{2-}$, Cl$^-$, ClO$_3^-$, ClO$_3^-$, ClO$_4^-$, ClO$^-$, KO$^-$, SbOH$_6^-$, SnCl$_6^{2-}$, [SnTe4]$^{4-}$, CrO$_4^{2-}$, Cr$_2$O$_7^{2-}$, MnO$_4^-$, NiCl$_6^{2-}$, [Cu(CO$_3$)$_2$(OH)$_2$]$^{4-}$, AsO$_4^{3-}$, Br$^-$, BrO$_3^-$, IO$_3^-$, I$^-$, CN$^-$, OCN$^-$, etc.

Suitable anions may also include anions derived from compounds containing a carboxylic acid group (e.g. a carboxylate anion), anions derived from compounds containing a hydroxyl group (e.g. an alkoxide, phenoxide or enolate anion), nitrogen based anions such as nitrate and nitrite, phosphorus based anions such as phosphates and phosphonates, or mixtures thereof.

Non-limiting examples of suitable anions derived from compounds containing a carboxylic acid group include acetate, oleate, salicylate anions, and mixtures thereof.

Non-limiting examples of suitable anions derived from compounds containing a hydroxyl group include phenate anions, and mixtures thereof.

Preferably, the anion $X^{q-}$ is selected from the group consisting of OH, a phenate group, a salicylate group, an oleate group and an acetate group. Most preferably the anion $X^{q-}$ is OH.

The one or more poly(hydroxycarboxylic acid) amide salt derivatives may be obtained by reaction of an amine and a poly(hydroxycarboxylic acid) of formula (I)

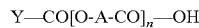 (I)

wherein Y is hydrogen or optionally substituted hydrocarbyl group, A is a divalent optionally substituted hydrocarbyl group and n is from 1 to 100, preferably from 1 to 10, with an acid or a quaternizing agent.

As used herein, the term "hydrocarbyl" represents a radical formed by removal of one or more hydrogen atoms from a carbon atom of a hydrocarbon (not necessarily the same carbon atoms in case more hydrogen atoms are removed).

Hydrocarbyl groups may be aromatic, aliphatic, acyclic or cyclic groups. Preferably, hydrocarbyl groups are aryl, cycloalkyl, alkyl or alkenyl, in which case they may be straight-chain or branched-chain groups.

Representative hydrocarbyl groups include phenyl, naphthyl, methyl, ethyl, butyl, pentyl, methylpentyl, hexenyl, dimethylhexyl, octenyl, cyclooctenyl, methylcyclooctenyl, dimethylcyclooctyl, ethylhexyl, octyl, isooctyl, dodecyl, hexadecenyl, eicosyl, hexacosyl, triacontyl and phenylethyl.

In the present invention, the phrase "optionally substituted hydrocarbyl" is used to describe hydrocarbyl groups optionally containing one or more "inert" heteroatom-containing functional groups. By "inert" is meant that the functional groups do not interfere to any substantial degree with the function of the compound.

The optionally substituted hydrocarbyl group Y in formula (I) herein is preferably aryl, alkyl or alkenyl containing up to 50 carbon atoms, more preferably in the range of from 7 to 25 carbon atoms. For example, the optionally substituted hydrocarbyl group Y may be conveniently selected from heptyl, octyl, undecyl, lauryl, heptadecyl, heptadenyl, heptadecadienyl, stearyl, oleyl and linoleyl.

Other examples of said optionally substituted hydrocarbyl group Y in formula (I) herein include $C_{4-8}$ cycloalkyls such as cyclohexyl; polycycloalkyls such as polycyclic terpenyl groups which are derived from naturally occurring acids such as abietic acid; aryls such as phenyl; aralkyls such as benzyl; and polyaryls such as naphthyl, biphenyl, stibenyl and phenylmethylphenyl.

In the present invention, the optionally substituted hydrocarbyl group Y may contain one or more functional groups such as carbonyl, carboxyl, nitro, hydroxy, halo, alkoxy, tertiary amino (no N—H linkages), oxy, cyano, sulphonyl and sulphoxyl. The majority of the atoms, other than hydrogen, in substituted hydrocarbyl groups are generally carbon, with the heteroatoms (e.g., oxygen, nitrogen and sulphur) generally representing only a minority, about 33% or less, of the total non-hydrogen atoms present.

Those skilled in the art will appreciate that functional groups such as hydroxy, halo, alkoxy, nitro and cyano in a substituted hydrocarbyl group Y will displace one of the hydrogen atoms of the hydrocarbyl, whilst functional groups such as carbonyl, carboxyl, tertiary amino (—N—), oxy, sulphonyl and sulphoxyl in a substituted hydrocarbyl group will displace a —CH— or —CH$_2$— moiety of the hydrocarbyl.

The hydrocarbyl group Y in formula (I) is more preferably unsubstituted or substituted by a group selected from hydroxy, halo or alkoxy group, even more preferably $C_{1-4}$ alkoxy.

Most preferably, the optionally substituted hydrocarbyl group Y in formula (I) is a stearyl group, 12-hydroxystearyl group, an oleyl group, a 12-hydroxyoleyl group or a group derived from naturally occurring oil such as tall oil fatty acid.

In a preferred embodiment of the present invention, the one or more poly(hydroxycarboxylic acid) amide salt derivatives are sulphur-containing poly(hydroxycarboxylic acid) amide salt derivatives.

More preferably, said one or more poly(hydroxycarboxylic acid) amide salt derivatives have a sulphur content in the range of from 0.1 to 2.0 wt. %, even more preferably in the range of from 0.6 to 1.2 wt. % sulphur, as measured by ICP-AES, based on the total weight of said poly(hydroxycarboxylic acid) amide salt derivatives.

The preparation of poly(hydroxycarboxylic acid) and its amide or other derivatives is known and is described, for instance, in EP 0 164 817, WO 95/17473, WO 96/07689, U.S. Pat. No. 5,536,445, GB 2 001 083, GB 1 342 746, GB 1 373 660, U.S. Pat. No. 5,000,792 and U.S. Pat. No. 4,349,389.

The preparation of the poly(hydroxycarboxylic acid)s of formula (I) may be made by the interesterification of one or more hydroxycarboxylic acids of formula (II)

HO-A-COOH (II)

wherein A is a divalent optionally substituted hydrocarbyl group, optionally in the presence of a catalyst according to well known methods. Such methods are described, for example, in U.S. Pat. No. 3,996,059, GB 1 373 660 and GB 1 342 746.

The chain terminator in said interesterification may be a non-hydroxycarboxylic acid.

The hydroxyl group in the hydroxycarboxylic acid and the carboxylic acid group in the hydroxycarboxylic acid or the non-hydroxycarboxylic acid may be primary, secondary or tertiary in character.

The interesterification of the hydroxycarboxylic acid and the non-hydroxycarboxylic acid chain terminator may be effected by heating the starting materials, optionally in a suitable hydrocarbon solvent such as toluene or xylene, and azeotroping off the formed water. The reaction may be carried out at a temperature up to –250° C., conveniently at the reflux temperature of the solvent.

Where the hydroxyl group in the hydroxycarboxylic acid is secondary or tertiary, the temperature employed should not be so high as to lead to dehydration of the acid molecule.

Catalysts for the interesterification, such as p-toluenesulphonic acid, zinc acetate, zirconium naphthenate or tetrabutyl titanate, may be included, with the objective of either increasing the rate of reaction at a given temperature or of reducing the temperature required for a given rate of reaction.

In the compounds of formulae (I) and (II), A is preferably an optionally substituted aromatic, aliphatic or cycloaliphatic straight chain or branched divalent hydrocarbyl group. Preferably, A is an arylene, alkylene or alkenylene group, in particular an arylene, alkylene or alkenylene group containing in the range of from 4 to 25 carbon atoms, more preferably in the range of from 12 to 20 carbon atoms.

Preferably, in said compounds of formulae (I) and (II), there are at least 4 carbon atoms, more preferably in the range of from 8 to 14 carbon atoms connected directly between the carbonyl group and the oxygen atom derived from the hydroxyl group.

In the compounds of formulae (I) and (II), the optional substituents in the group A are preferably selected from hydroxy, halo or alkoxy groups, more preferably $C_{1-4}$ alkoxy groups.

The hydroxyl group in the hydroxycarboxylic acids of formula (II) is preferably a secondary hydroxyl group.

Examples of suitable hydroxycarboxylic acids are 9-hydroxystearic acid, 10-hydroxystearic acid, 12-hydroxystearic acid, 12-hydroxy-9-oleic acid (ricinoleic acid), 6-hydrocaproic acid, preferably 12-hydroxystearic acid. Commercial 12-hydroxystearic acid (hydrogenated castor oil fatty acid) normally contains up to 15% wt of stearic acid and other non-hydroxycarboxylic acids as impurities and can conveniently be used without further admixture to produce a polymer of molecular weight about 1000-2000.

Where the non-hydroxycarboxylic acid is introduced separately to the reaction, the proportion which is required in order to produce a polymer or oligomer of a given molecular weight can be determined either by simple experiment or by calculation by the person skilled in the art.

The group (—O-A-CO—) in the compounds of formulae (I) and (II) is preferably a 12-oxystearyl group, 12-oxyoleyl group or a 6-oxycaproyl group.

Preferred poly(hydroxycarboxylic acid)s of formula (I) for reaction with amine include poly(hydroxystearic acid) and poly(hydroxyoleic acid).

The amines which react with poly(hydroxycarboxylic acid)s of formula (I) to form poly(hydroxycarboxylic acid) amide intermediates may include those defined in WO 97/41092.

For example, various amines and their preparations are described in U.S. Pat. No. 3,275,554, U.S. Pat. No. 3,438,757, U.S. Pat. No. 3,454,555, U.S. Pat. No. 3,565,804, U.S. Pat. No. 3,755,433 and U.S. Pat. No. 3,822,209.

The amine reactant is preferably a diamine, a triamine or a polyamine.

Preferred amine reactants are diamines selected from ethylenediamine, N,N-dimethyl-1,3-propanediamine, triamines and polyamines selected from dietheylenetriamine, triethylenetetramine, tetraethylenepentamine, pentaethylenehexamine and tris(2-aminoethyl)amine.

The amidation between the amine reactant and the (poly(hydroxycarboxylic acid) of formula (I) may be carried out according to methods known to those skilled in the art, by heating the poly(hydroxycarboxylic acid) with the amine reactant, optionally in a suitable hydrocarbon solvent such as toluene or xylene, and azeotroping off the formed water. Said reaction may be carried out in the presence of a catalyst such as p-toluenesulphonic acid, zinc acetate, zirconium naphthenate or tetrabutyl titanate.

The poly(hydroxycarboxylic acid) amide intermediate formed from reaction of the amine and the poly(hydroxycarboxylic acid) of formula (I) may be reacted with an acid or a quaternizing agent to form a salt derivative, according to well-known methods.

Acids that may be used to form the salt derivative may be selected from organic or inorganic acids. Said acids are preferably sulphur-containing organic or inorganic acids. Preferably, said acids are selected from sulphuric acid, methanesulphonic acid and benzenesulphonic acid.

Quaternizing agents that may be used to form the salt derivative may be selected from dimethylsulphuric acid, a dialkyl sulphate having from 1 to 4 carbon atoms, an alkyl halide such as methyl chloride, methyl bromide, aryl halide such as benzyl chloride.

In a preferred embodiment, the quaternizing agent is a sulphur-containing quaternizing agent, in particular dimethylsulphuric acid or an dialkyl sulphate having from 1 to 4 carbon atoms. The quaternizing agent is preferably dimethyl sulphate.

Quaternization is a well-known method in the art. For example, quaternization using dimethyl sulphate is described in U.S. Pat. No. 3,996,059, U.S. Pat. No. 4,349,389 and GB 1 373 660.

The person skilled in the art will readily understand how to replace one anion $X^{q-}$ by another using conventional processes including washing with a solution of the desired anion and/or using ion-exchange techniques involving a ion-exchange column. Alternatively, the desired anion can be inserted during the quaternization reaction.

Poly(hydroxycarboxylic acid) amide salt derivatives that are preferred in the present invention are those which each have a TBN (total base number) value of less than 30 mg.KOH/g, as measured by ASTM D 4739, preferably less than 20. Preferably, the TBN value of formulated lubricating compositions according to the present invention containing the poly(hydroxycarboxylic acid) amide salt derivative is below 10 mg.KOH/g, as measured by ASTM D 4739.

Examples of commercially available poly(hydroxycarboxylic acid) amide salt derivatives include that available from Lubrizol under the trade designation "SOLSPERSE 17000" (a reaction product of poly(12-hydroxystearic acid) with N,N-dimethyl-1,3-propanediamine and dimethyl sulphate) and those available under the trade designations "CH-5" and "CH-7" from Shanghai Sanzheng Polymer Company. "CH-5" product has a TBN value of approximately 2.0 mg.KOH/g, as measured by ASTM D 4739. Furthermore, "CH-5" product has a sulphur content of approximately 0.86 wt. %, as measured by ICP-AES. These commercially available products can be used for preparing the poly(hydroxycarboxylic acid) amide salt derivatives according to the present invention by appropriate replacement of the anion $X^{q-}$, where needed.

In another aspect the present invention relates to a lubricating composition comprising:
 a base oil; and
 a poly(hydroxycarboxylic acid) amide salt derivative as defined in the present invention.

Typically, the poly(hydroxycarboxylic acid) amide salt derivative is present in the lubricating composition of the present invention in an amount in the range of from 0.1 to 10.0 wt. %, more preferably in an amount in the range of from 0.1 to 5.0 wt. %, based on the total weight of the lubricating composition. According to an especially preferred embodiment of the present invention, the composition comprises less than 5.0 wt. %, preferably less than 2.0 wt. % of the poly (hydroxycarboxylic acid) amide salt derivative, based on the total weight of the lubricant composition.

Typically, the lubricating composition according to the present invention has a relatively low phosphorus content such as below 0.12 wt. % (according to ASTM D 5185). Preferably, the composition has a phosphorus content of less than 0.08 wt. %. Preferably, the composition has a phosphorus content of above 0.06 wt. %.

Also, it is preferred that the composition has a sulphur content of less than 0.6 wt. % (according to ASTM D 5185).

Further it is preferred that the composition has a chlorine content of less than 200 ppm (according to ASTM D 808).

According to an especially preferred embodiment the composition has a sulphated ash content of below 2.0 wt. % (according to ASTM D 874).

According to an especially preferred embodiment of the present invention, the composition comprises a zinc dialkyl dithiophosphate (ZDDP) compound. Typically, if present, the ZDDP compound is present in an amount of 0.01-1.5 wt. %, preferably 0.4-1.0 wt. %. The ZDDP compound may have been made from primary, secondary, tertiary alcohols or mixtures thereof, preferably containing less than 12 carbon atoms. Preferably, the ZDDP compound has been made from secondary alcohols containing 3 to 8 carbon atoms.

There are no particular limitations regarding the base oil used in lubricating composition according to the present invention, and various conventional mineral oils, synthetic oils as well as naturally derived esters such as vegetable oils may be conveniently used.

The base oil used in the present invention may conveniently comprise mixtures of one or more mineral oils and/or one or more synthetic oils; thus, according to the present invention, the term "base oil" may refer to a mixture containing more than one base oil. Mineral oils include liquid petroleum oils and solvent-treated or acid-treated mineral lubricating oil of the paraffinic, naphthenic, or mixed paraffinic/naphthenic type which may be further refined by hydrofinishing processes and/or dewaxing.

Suitable base oils for use in the lubricating oil composition of the present invention are Group I-III mineral base oils, Group IV poly-alpha olefins (PAOs), Group II-III Fischer-Tropsch derived base oils and mixtures thereof.

By "Group I", "Group II", "Group III" and "Group IV" base oils in the present invention are meant lubricating oil base oils according to the definitions of American Petroleum Institute (API) for categories I-IV. These API categories are defined in API Publication 1509, 16th Edition, Appendix E, April 2007.

Fischer-Tropsch derived base oils are known in the art. By the term "Fischer-Tropsch derived" is meant that a base oil is, or is derived from, a synthesis product of a Fischer-Tropsch process. A Fischer-Tropsch derived base oil may also be referred to as a GTL (Gas-To-Liquids) base oil. Suitable Fischer-Tropsch derived base oils that may be conveniently used as the base oil in the lubricating composition of the present invention are those as for example disclosed in EP 0 776 959, EP 0 668 342, WO 97/21788, WO 00/15736, WO 00/14188, WO 00/14187, WO 00/14183, WO 00/14179, WO 00/08115, WO 99/41332, EP 1 029 029, WO 01/18156 and WO 01/57166.

Synthetic oils include hydrocarbon oils such as olefin oligomers (including polyalphaolefin base oils; PAOs), dibasic acid esters, polyol esters, polyalkylene glycols (PAGs), alkyl naphthalenes and dewaxed waxy isomerates. Synthetic hydrocarbon base oils sold by the Shell Group under the designation "Shell XHVI" (trade mark) may be conveniently used.

Poly-alpha olefin base oils (PAOs) and their manufacture are well known in the art. Preferred poly-alpha olefin base oils that may be used in the lubricating compositions of the present invention may be derived from linear C2 to C32, preferably C6 to C16, alpha olefins. Particularly preferred feedstocks for said poly-alpha olefins are 1-octene, 1-decene, 1-dodecene and 1-tetradecene.

The total amount of base oil incorporated in the lubricating composition of the present invention is preferably present in an amount in the range of from 60 to 99 wt. %, more preferably in an amount in the range of from 65 to 98 wt. % and most preferably in an amount in the range of from 70 to 95 wt. %, with respect to the total weight of the lubricating composition.

Preferably, the finished lubricating composition has a kinematic viscosity in the range of from 2 to 80 mm²/s at 100° C., more preferably in the range of from 3 to 70 mm²/s, most preferably in the range of from 4 to 50 mm²/s.

The lubricating composition of the present invention may further comprise additional additives such as anti-wear additives, anti-oxidants, dispersants, detergents, friction modifiers, viscosity index improvers, pour point depressants, corrosion inhibitors, defoaming agents and seal fix or seal compatibility agents.

As the person skilled in the art is familiar with the above and other additives, these are not further discussed here in detail. Specific examples of such additives are described in for example Kirk-Othmer Encyclopedia of Chemical Technology, third edition, volume 14, pages 477-526.

Preferably the detergent, if present, is selected from phenate- and sulphonate-type detergents; accordingly, preferably no salicylate-type detergents are present.

The lubricating compositions of the present invention may be conveniently prepared by admixing the poly(hydroxycarboxylic acid) amide salt derivative, and, optionally, any further additives that are usually present in lubricating compositions, for example as herein before described, with mineral and/or synthetic base oil.

In another aspect the present invention relates to a fuel composition comprising:

a base fluid suitable for use in an internal combustion engine; and a poly(hydroxycarboxylic acid) amide salt derivative as defined in the present invention.

The base fluid may be any fluid which is suitable for use as a functional fluid to be used as a fuel in an internal combustion engine. Suitable base fluids include fuels, such as gasoline and diesel fuel.

The nature of the base fluid is not critical and can be any such fluid known in the art, such as gasoline and diesel fuels, for example, as described in Ullmann's Encyclopedia of Industrial Chemistry, 5th Ed. 1990, Volume A16, p. 719 ff, and Kirk Othmer Encyclopedia of Chemical Technology, $4^{th}$ Ed. 1994, Volume 12, p. 341-388.

Where the base fluid is a gasoline, the fuel containing it is a gasoline composition; where the base fluid is a diesel fuel, the fuel containing it is a diesel fuel composition.

For further information on the fuel composition, such as typical properties, amounts of additives, etc. reference is made to WO 2009/050287 (in particular page 6, line 13-page 20, line 4), the teaching of which is hereby incorporated by specific reference.

Typically, the poly(hydroxycarboxylic acid) amide salt derivative is present in the fuel composition of the present invention in an amount in the range of from 0.1 to 10.0 wt. %, more preferably in an amount in the range of from 0.1 to 5.0 wt. %, based on the total weight of the fuel composition.

In another aspect, the present invention provides the use of a poly(hydroxycarboxylic acid) amide salt derivative as defined in the present invention, or a lubricating composition or fuel composition containing it, for decreasing the phosphorus volatility of a fluid, preferably of a lubricating composition. Of course, in order to decrease the phosphorus volatility of a lubricating composition such as an engine oil, this may be achieved by adding the poly(hydroxycarboxylic acid) amide salt derivative to the lubricating composition or to a fuel to be used in the internal combustion engine. In the latter case, the poly(hydroxycarboxylic acid) amide salt derivative may end up in the lubricating composition during use of the internal combustion engine.

The person skilled in the art will readily understand that the lubricating composition according to the present invention may also be suitably used for other uses than in an internal combustion engine, especially where the phosphorus volatility plays a role.

The present invention is described below with reference to the following Examples, which are not intended to limit the scope of the present invention in any way.

EXAMPLES

Preparation of the Poly(hydroxycarboxylic acid) Amide Salt Derivative

Example A 8 gram of the poly(hydroxycarboxylic acid) amide salt derivative commercially available from Shanghai Sanzheng Polymer Company under the trade designation "CH-5" was dissolved in 140 ml of dichloromethane (DCM) whilst stirring. The resultant mixture was further diluted with 110 ml DCM and added to a separation funnel containing 250 ml of 1M KOH solution.

The funnel was shaken and allowed to stand until there was clear separation between the two layers. The organic bottom layer was collected and added to 250 ml of fresh 1M KOH in a separation funnel. Again, the organic bottom layer was collected, dried over MgSO4 and concentrated in vacuo. About 6 gram of poly(hydroxycarboxylic acid) amide salt derivative wherein the anion $X^{q-}$ is OH was obtained.

The obtained poly(hydroxycarboxylic acid) amide salt derivative had a TBN content of 17.0 mg.KOH/g (according to ASTM D 4739).

Example B

The "CH-5" product (see Example A) was ion-exchanged with a sodium salicylate (available from Sigma-Aldrich Chemical Company, Gillingham, United Kingdom) in a ion-exchange column, whilst using 1:3 MeOH:CHCl₃ as an eluent.

To this end, a column was prepared using 500 gram Dowex 1×8 ion-exchange resin (200-400 mesh, strongly basic Cl⁻ form; CAS nr [69011-19-4]) which was washed in 1 l of deionised water. The washed Dowex resin was then loaded as a suspension onto a column using 1 l of 1:1 MeOH:de-ionised water. The resin was then washed with 4 bed volumes of 1:1 methanol/de-ionised water and loaded with a 30 wt. % solution of the sodium salicylate salt of in a small amount of MeOH.

Subsequent polarity change of the resin was done in the following order: 2×4 bed volumes of 1:1 MeOH/de-ionised water; 1×4 bed volumes of MeOH; 4 bed volumes of 3:1, then 1:1, then 1:3 of MeOH:chloroform.

220 gram of the "CH-5" product was dissolved in a minimum amount of eluent (1:3 MeOH:chloroform) and loaded onto the column. The column was eluted, whilst following the elution by means of thin layer chromatography using appropriate staining techniques. The eluent was collected and concentrated in vacuo to dryness to yield about 200 gram of poly(hydroxycarboxylic acid) amide salt derivative wherein the anion $X^{q-}$ is salicylate.

The obtained poly(hydroxycarboxylic acid) amide salt derivative had a TBN content of 13.3 mg.KOH/g (according to ASTM D 4739).

Example C

Similar to Example B, a poly(hydroxycarboxylic acid) amide salt derivative was obtained wherein the anion $X^{q-}$ is a phenate. To this end sodium phenoate (available from Sigma-Aldrich Chemical Company, Gillingham, United Kingdom) was used.

The obtained poly(hydroxycarboxylic acid) amide salt derivative had a TBN content of 14.5 mg.KOH/g (according to ASTM D 4739).

Example D

Similar to Example B, a poly(hydroxycarboxylic acid) amide salt derivative was obtained wherein the anion $X^{q-}$ is an oleate. To this end sodium oleate (available from Sigma-Aldrich Chemical Company, Gillingham, United Kingdom) was used.

The obtained poly(hydroxycarboxylic acid) amide salt derivative had a TBN content of 12.8 mg.KOH/g (according to ASTM D 4739).

Example E

Similar to Example B, a poly(hydroxycarboxylic acid) amide salt derivative was obtained wherein the anion $X^{q-}$ is an acetate. To this end sodium acetate (available from Sigma-Aldrich Chemical Company, Gillingham, United Kingdom) was used.

The obtained poly(hydroxycarboxylic acid) amide salt derivative had a TBN content of 14.0 mg.KOH/g (according to ASTM D 4739).

Lubricating Oil Compositions

Various lubricating compositions for use in an internal combustion engine were formulated.

Table 1 indicates the composition of the lubricating compositions that were tested; the amounts of the components are given in wt. %, based on the total weight of the compositions. All tested compositions were so-called mid-SAPS compositions, i.e. containing a sulphated ash content of less than 0.8 wt. % (according to ASTM D 874), a phosphorus content of less than 0.08 wt. % (according to ASTM D 5185) and a sulphur content of less than 0.6 wt. % (according to ASTM D 5185). The compositions had a chlorine content of less than 200 ppm (according to ASTM D 808).

All tested engine oil formulations contained a combination of a base oil, a poly(hydroxycarboxylic acid) amide salt derivative and an additive package, which additive package was the same in all tested compositions.

The "Base oil" was a commercially available API Group III base oil having a kinematic viscosity at 100° C. (ASTM D445) of approx. 5.2 cSt (mm²s⁻¹); this base oil is commercially available from e.g. Shell Global Lubricants, United Kingdom under the trade designation "XHVI 5.2".

The additive package was a so-called "mid SAPS" (sulphated ash, phosphorus and sulphur) formulation. The additive package contained a combination of additives including phenolic and aminic anti-oxidants, a metallic and ashless friction modifier mixture, a ZDDP anti-wear additive, a dispersant, an overbased detergent mixture and about 10 ppm of an anti-foaming agent.

As the poly(hydroxycarboxylic acid) amide salt derivative the products of Examples A-E were used; as a comparison the commercially available "CH-5" product (cited on page 15, line 7 of WO 2007/128740) as mentioned in Example A was used. The "CH-5" product contains a methyl sulphate ($MeOSO_3^-$) as the anion $X^{q-}$.

The compositions of Examples 1-5 and Comparative Example 1 were obtained by mixing the base oils with the other components using conventional lubricant blending procedures.

TABLE 1

| Component [wt. %] | Ex. 1 | Ex. 2 | Ex. 3 | Ex. 4 | Ex. 5 | Comp. Ex. 1 |
|---|---|---|---|---|---|---|
| Base oil (Group III) | 86.5 | 86.5 | 86.5 | 86.5 | 86.5 | 86.5 |
| Additive package | 12.0 | 12.0 | 12.0 | 12.0 | 12.0 | 12.0 |
| "CH-5" product (methyl sulphate) | — | — | — | — | — | 1.5 |
| Product of Example A (OH) | 1.5 | — | — | — | — | — |
| Product of Example B (salicylate) | — | 1.5 | — | — | — | — |
| Product of Example C (phenate) | — | — | 1.5 | — | — | — |
| Product of Example D (oleate) | — | — | — | 1.5 | — | — |
| Product of Example E (acetate) | — | — | — | — | 1.5 | — |
| TOTAL | 100 | 100 | 100 | 100 | 100 | 100 |
| Properties of total formulation | | | | | | |
| TBN value [mg · KOH/g] (ASTM D 4739) | 7.4 | 8.2 | 8.5 | 7.9 | 8.5 | n.d. | n.d. = not determined

Phosphorus Volatility Test

In order to demonstrate the phosphorus volatility properties of the present invention, measurements were performed according to the phosphorus emission index (PEI) test, which is also known as the "Selby-Noack PEI test". This test has been described in T. W. Selby, R. J. Bosch and D. C. Fee, "Continued Studies of the Causes of Engine Oil, Phosphorus Volatility—Part 2". SAE 2007-01-1073, the teaching of which is hereby incorporated by specific reference. The "Selby-Noack PEI test" is similar to the "Noack procedure" as described in ASTM D 5800, procedure C, but deviates in duration (16 hours instead of 60 minutes for the Noack procedure) and temperature (250° C. for the Noack procedure).

The measured phosphorus volatility values (measured as PEI 165; the Phosphorus Emission Index obtained when the Selby-Noack equipment is run at 165° C. instead of at 250° C. for the Noack procedure) are given in Table 2 below. As the PEI is an approximation of the quantity of phosphorus (mg) obtained from 1 kg of fluid, it has no unit.

TABLE 2

| Example | PEI 165 |
|---|---|
| Example 1 (OH) | 60 |
| Example 2 (salicylate) | 53 |
| Example 3 (phenate) | 60 |
| Example 4 (oleate) | 51 |
| Example 5 (acetate) | 63 |
| Comp. Ex. 1 (methyl sulphate) | 126 |

DISCUSSION

As is clearly shown in Table 2, the phosphorus volatility properties for the compositions according to the present invention were significantly improved when compared with Comparative Example 1. In this respect it is noted that a low PEI 165 value indicates a good phosphorus volatility value.

What is claimed is:

1. A poly(hydroxycarboxylic acid) amide salt derivative having formula (III):

$$[Y\text{—}CO[O\text{-}A\text{-}CO]_n\text{—}Z\text{—}R^+]_m pX^{q-} \quad (III)$$

where Y is hydrogen or an optionally substituted hydrocarbyl group, A is a divalent optionally substituted hydrocarbyl group, n is from 1 to 100, m is from 1 to 4, q is from 1 to 4 and p is an integer such that pq=m, Z is an optionally substituted divalent bridging group which is attached to the carbonyl group through a nitrogen atom, $R^+$ is an ammonium group and $X^{q-}$ is selected from the group consisting of OH, phenate groups, salicylate groups, oleate groups, and combinations thereof.

2. The poly(hydroxycarboxylic acid) amide salt derivative according to claim 1 wherein the poly(hydroxycarboxylic acid) amide salt derivative has a TBN (total base number) value of less than 30 mg.KOH/g.

3. A lubricating composition comprising:
   a base oil; and
   a poly(hydroxycarboxylic acid) amide salt derivative having formula (III):

$$[Y\text{—}CO[O\text{-}A\text{-}CO]_n\text{—}Z\text{—}R^+]_m pX^{q-} \quad (III)$$

where Y is hydrogen or an optionally substituted hydrocarbyl group, A is a divalent optionally substituted hydrocarbyl group, n is from 1 to 100, m is from 1 to 4, q is from 1 to 4 and p is an integer such that pq=m, Z is an optionally substituted divalent bridging group which is attached to the carbonyl group through a nitrogen atom, $R^+$ is an ammonium group and $X^{q-}$ is selected from the group consisting of OH, phenate groups, salicylate groups, oleate groups, and combinations thereof.

4. The lubricating composition according to claim 3 wherein the composition comprises less than 5.0 wt. % of the poly(hydroxycarboxylic acid) amide salt derivative, based on the total weight of the lubricating composition.

5. The lubricating composition according to claim 3 wherein the composition has a phosphorus content of less than 0.08 wt. %.

6. The lubricating composition according to claim 3 wherein the composition has a sulphur content of less than 0.6 wt. %.

7. The lubricating composition according to claim 3 wherein the composition has a chlorine content of less than 200 ppm.

8. The lubricating composition according to claim 3 wherein the composition has a sulphated ash content of below 2.0 wt. % (according to ASTM D 874).

9. The lubricating composition according to claim 3 wherein the composition comprises a zinc dialkyl dithiophosphate (ZDDP) compound.

10. A fuel composition comprising:
    a base fluid suitable for use in an internal combustion engine; and
    a poly(hydroxycarboxylic acid) amide salt derivative having formula (III):

$$[Y\text{—}CO[O\text{-}A\text{-}CO]_n\text{—}Z\text{—}R^+]_m pX^{q-} \quad (III)$$

where Y is hydrogen or an optionally substituted hydrocarbyl group, A is a divalent optionally substituted hydrocarbyl group, n is from 1 to 100, m is from 1 to 4, q is from 1 to 4 and p is an integer such that pq=m, Z is an optionally substituted divalent bridging group which is attached to the carbonyl group through a nitrogen atom, $R^+$ is an ammonium group and $X^{q-}$ is selected from the group consisting of OH, phenate groups, salicylate groups, oleate groups, and combinations thereof.

11. The poly(hydroxycarboxylic acid) amide salt derivative according to claim 1 wherein n is from 1 to 10.

12. The poly(hydroxycarboxylic acid) amide salt derivative according to claim 1 wherein the poly(hydroxycarboxylic acid) amide salt derivative has a TBN (total base number) value of less than 20 mg.KOH/g.

* * * * *